(12) United States Patent
Beadle

(10) Patent No.: US 7,688,730 B2
(45) Date of Patent: Mar. 30, 2010

(54) SYSTEM AND METHOD FOR MULTI-CHANNEL DATA-ADAPTIVE THRESHOLDING FOR SHARED CHANNELS WITH TIME-VARYING RATE CONSTRAINTS

(75) Inventor: Edward R. Beadle, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 354 days.

(21) Appl. No.: 11/961,200

(22) Filed: Dec. 20, 2007

(65) Prior Publication Data

US 2009/0161543 A1 Jun. 25, 2009

(51) Int. Cl.
*G08C 15/00* (2006.01)

(52) U.S. Cl. .................. 370/232; 370/229; 370/230; 370/231

(58) Field of Classification Search .......... 370/229, 370/230, 231, 232, 234, 235
See application file for complete search history.

(56) References Cited

U.S. PATENT DOCUMENTS

| | | | | |
|---|---|---|---|---|
| 5,673,253 | A * | 9/1997 | Shaffer | 370/229 |
| 5,940,370 | A * | 8/1999 | Curtis et al. | 370/231 |
| 6,075,772 | A * | 6/2000 | Brown et al. | 370/235 |
| 6,512,744 | B1 * | 1/2003 | Hughes et al. | 370/232 |
| 6,560,231 | B1 * | 5/2003 | Kawakami et al. | 370/395.43 |
| 6,735,630 | B1 * | 5/2004 | Gelvin et al. | 709/224 |
| 6,947,445 | B1 | 9/2005 | Barnhart | 370/468 |
| 6,967,923 | B1 * | 11/2005 | Fang | 370/232 |
| 7,072,295 | B1 * | 7/2006 | Benson et al. | 370/230 |
| 7,076,695 | B2 | 7/2006 | McGee et al. | 714/47 |
| 7,142,522 | B2 | 11/2006 | Baudoin et al. | 370/322 |
| 7,587,512 | B2 * | 9/2009 | Ta et al. | 709/233 |
| 2006/0152355 | A1 | 7/2006 | Suenbuel et al. | 340/511 |
| 2007/0064604 | A1 * | 3/2007 | Chen et al. | 370/230 |
| 2007/0091922 | A1 * | 4/2007 | Elliot et al. | 370/468 |
| 2008/0259803 | A1 * | 10/2008 | Elliot et al. | 370/237 |
| 2009/0207731 | A1 * | 8/2009 | Carlson et al. | 370/232 |
| 2009/0279567 | A1 * | 11/2009 | Ta et al. | 370/468 |

FOREIGN PATENT DOCUMENTS

EP 0 847 220 10/1998

* cited by examiner

*Primary Examiner*—Chi H Pham
*Assistant Examiner*—Robert Lopata
(74) *Attorney, Agent, or Firm*—Allen, Dyer, Doppelt, Milbrath & Gilchrist, P.A.

(57) ABSTRACT

A system and method allocates bandwidth for a plurality of data sources within a communications network. The data sources each generate data and transmit the generated data along communications channels in a shared communications link of the communications network. Each data source includes a data sensor for sensing data generation at each data source indicative of network resource usage. A node is connected to the communications link for receiving the data generated from respective data sources. A controller is associated with at least one of the node and each data sensor and data source for establishing data sensor detection thresholds, reallocating excess data capacity from underused channels to those channels requiring excess data capacity, and setting new data detection thresholds for each data sensor based on reallocated data rates at each data source.

24 Claims, 17 Drawing Sheets

1. CONTROL DATA GENERATION AND (THRESHOLDS) OF SENSORS
2. ACTIVE SENSORS CAN LOWER THRESHOLDS BASED ON INITIAL RATE ALLOCATION TO IMPROVE SENSITIVITY
3. DATA PRIORITIZATION CAN BE MEASURED BY TOTAL DETECTION STRENGTH
4. CONTROL DATA GENERATION RATE OF DATA SOURCES AND ACHIEVE MAXIMUM SENSITIVITY AT GLOBAL LEVEL (STATISTICALLY SIGNIFICANT/ REPRESENTATIVE) TRAINING DATA COLLECTED
INITIAL ALLOCATION IS 20% OF LINK CAPACITY PER SENSOR (10 TRAINING DETECT OPPTY * $R_i$ = NUM DETECTS)

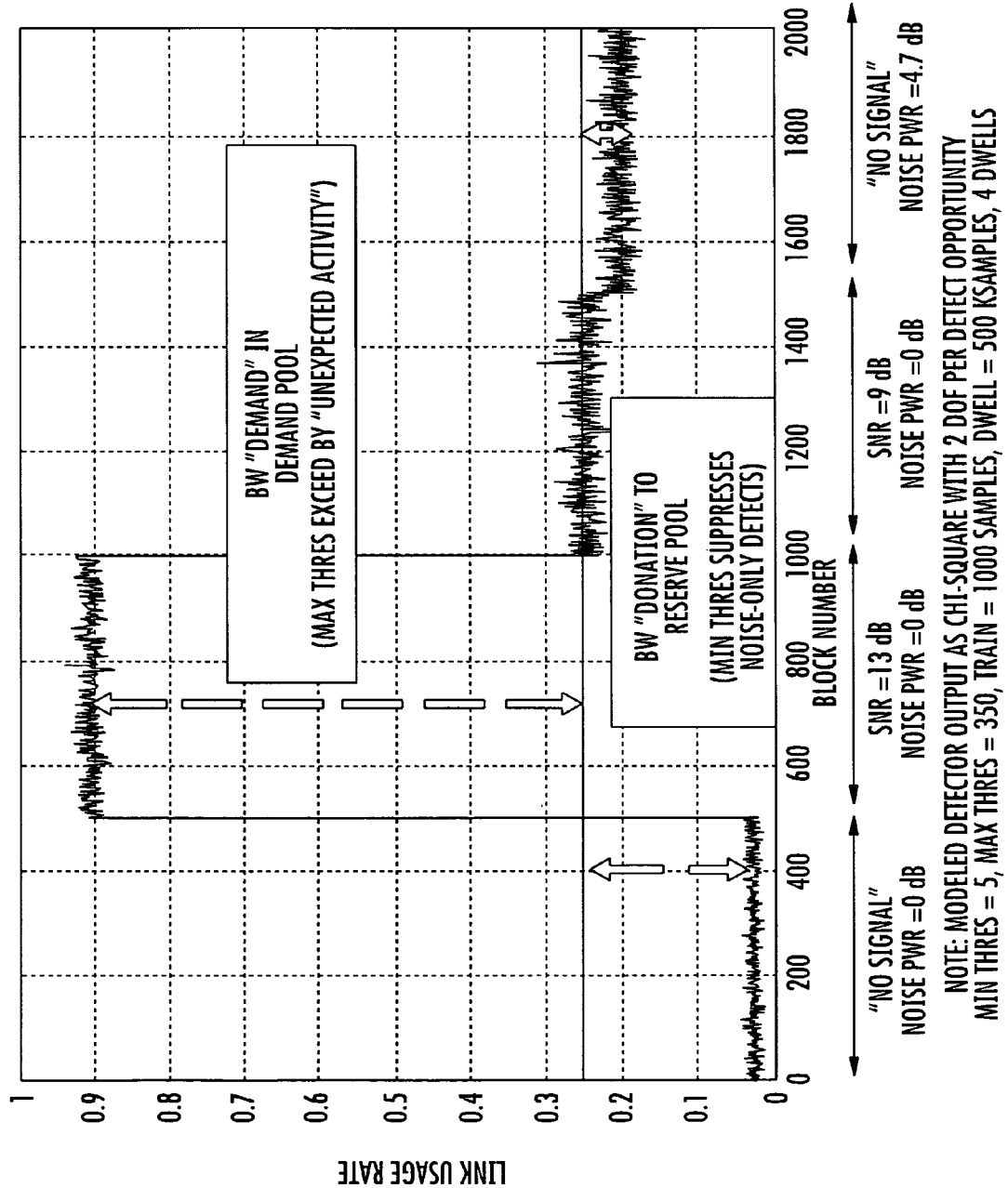

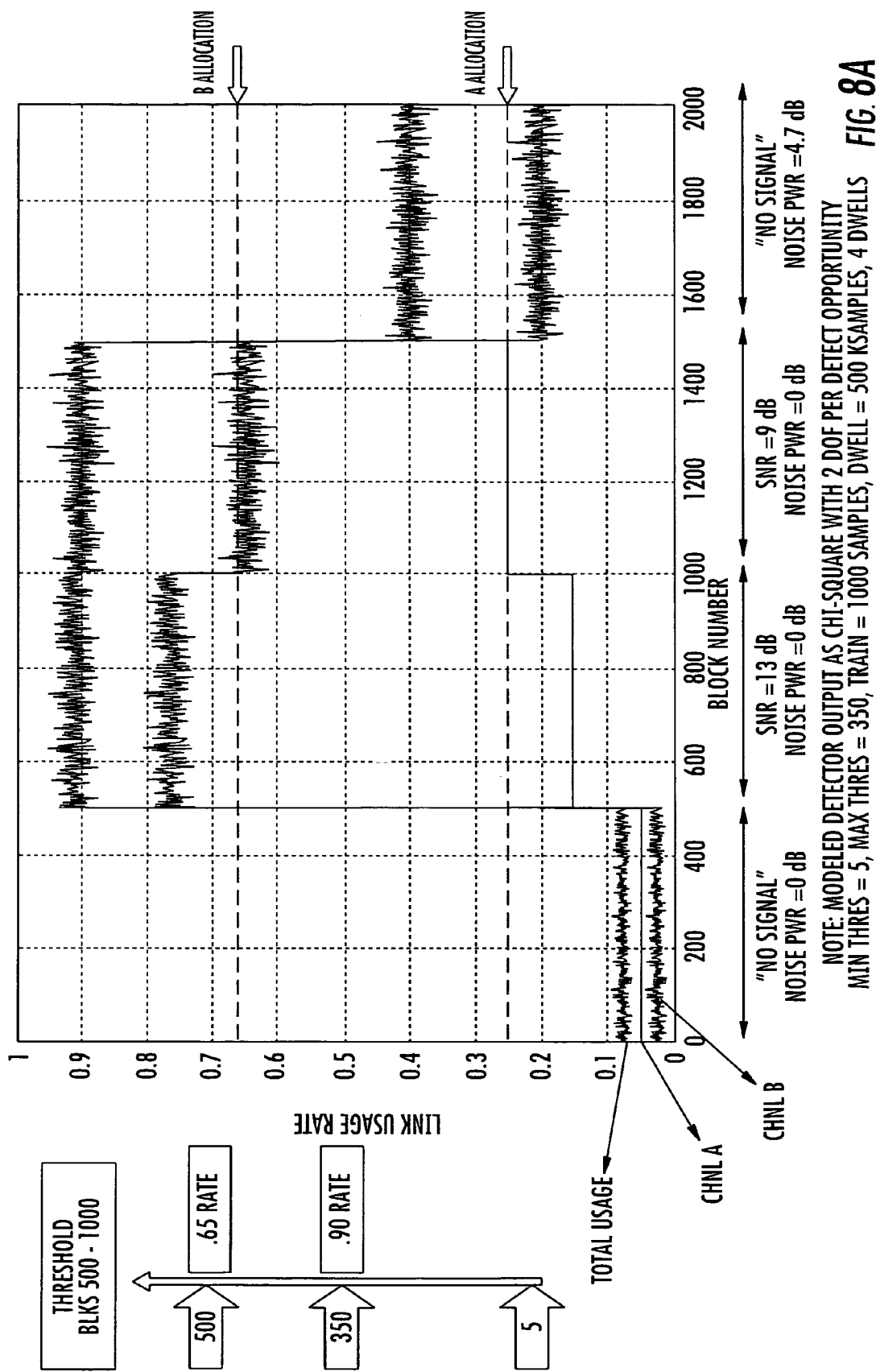

SYSTEM AND METHOD FOR MULTI-CHANNEL DATA-ADAPTIVE THRESHOLDING FOR SHARED CHANNELS WITH TIME-VARYING RATE CONSTRAINTS

FIELD OF THE INVENTION

The present invention relates to communications systems for distributed sensor networks, and more particularly, the present invention relates to adaptively controlling the data detection (or sensor) thresholds within the nodes of a multi-sensor system while simultaneously controlling the node data rate allocations.

BACKGROUND OF THE INVENTION

Modern communication systems often use packet based routers (e.g., IP networks, ad hoc sensor networks, etc.) and the routers can become overwhelmed when the volume of data to be transferred exceeds the available communication bandwidth. As a result, traffic control and traffic congestion avoidance systems are becoming increasingly popular and necessary to control this network traffic.

A safe design option is to avoid traffic congestion all together by over-designing the communication links to carry worst case traffic loads on all links. However, a weakness of the option is that this is wasteful of bandwidth when each node is not using its full allocation. Additionally the implementation costs associated with such a design methodology may be prohibitive.

A more typical approach is more statistical in nature, where the expected level and typical variations in traffic loads and data source characteristics are used to size inter-node links or share a common link resource (e.g. bandwidth). For example typical statistical multiplexing divides a communications link into an arbitrary number of variable bit-rate digital channels or data streams with each data source receiving an a-priori allocated a capacity based on its assumed statistics. A weakness in this approach is that often limited accurate data or models are available; hence the system may perform unacceptably poorly under actual traffic conditions. Typical performance impacts of congested inter-node communication include latent data transfers due to buffering messages for a less congested time, expanded buffer memory in nodes to hold messages for transmission in less congested times, or just dropping packets completely which causes the source to request a retransmission (e.g., IP packet transfer).

Similar to standard statistical multiplexing are systems that dynamically allocate link resources (e.g. bandwidth) based on prevailing conditions. These algorithms are commonly referred to as dynamic bandwidth allocation (DBA). Dynamic bandwidth allocation takes advantage of several attributes of shared networks. Typically, all users are not connected to the network at one time, but even if all users are connected, they are not transmitting data (or voice or video) at all times. Also, most traffic is "bursty," i.e., there are gaps between packets of information that can be filled with other user traffic. Other general techniques for overcoming problems associated with network congestion include Resource Auction Multiple Access (RAMA); Demand Assignable Multiple Access (DAMA); Random Access (aloha/slotted aloha); Bandwidth-on-Demand (BOD); Quality of Service (QOS) guarantee; and a number of different reservation protocols.

Still other prior art techniques control the networking system say by employing data labels or prioritization schemes. For example, some users may charged more to have certain service guarantees (e.g. maximum latency) through the network so when their data arrives a label in the packet indicates the high priority nature of the data for transmission. Other methods use a demand assignment device to allocate resources to each user, with the bit rates authorized by a congestion controller subsystem that operates globally for all connections supported by the user station. These techniques manage network flow, but do not control data generated from the data sources or the thresholds of any data sensors associated with the data sources.

All prior art systems in this subject matter deal with control of network traffic and managing congestion of data already within the network. Part of the novelty of this invention is the co-ordination of congestion control by dynamically linking the data generation (e.g. detection thresholds) in a distributed sensor system sharing a common communication link.

Hence, the current invention will provide a useful mechanism to allocate the transfer of data from a plurality of nodes to a central node over a shared access medium or link while maintaining the overall best possible (global) sensitivity at the detection nodes using a novel data adaptive thresholding technique.

SUMMARY OF THE INVENTION

The objective of invention is to globally maximize sensor utility (e.g., sensitivity) while meeting aggregate system-level link bandwidth constraints for the nodes.

A system and method allocates bandwidth for a plurality of data sources within a communications network. The data sources each generate data and the data is transmitted along communications channels in a shared communications link/medium of the communications network. Each data source includes sensor for the data generation. The sensor is operative to indicate a "detect" when the quantity measured exceeds a certain threshold (e.g. a RADAR detector). The detection event along with other metadata concerning the detection event are formed in a packet (of possibly non-fixed length) and queued for transmission at each sensing node. The data is transferred to a concentrator or gateway node with limited connectivity to the rest of the network (see FIG. 1A). The limited connectivity must be judiciously shared amongst the data sources competing for data transmission. In the concentrator or gateway node is a multiplexer connected to the communications link for receiving the data generated from respective data sources. A controller is associated with at least one of the nodes and each data sensor and data source for establishing data sensor detection thresholds, reallocating excess data capacity from underused channels to those channels requiring excess data capacity, and setting new data detection thresholds for each data sensor based on reallocated data rates at each data source.

The controller is operative for setting maximum and minimum sensitivities on each data sensor and setting detection thresholds for each data sensor to meet an initially allocated data rate. The detection thresholds can be set during a training interval interspersed with data collection. An order-statistic approach can be used for setting the detection threshold. The controller can be operative for a-periodically retraining when sensing deviations in data generation.

A method is also set forth.

BRIEF DESCRIPTION OF THE DRAWINGS

Other objects, features and advantages of the present invention will become apparent from the detailed description of the invention which follows, when considered in light of the accompanying drawings in which:

FIGS. 7A through 7D are graphs showing the sample results for a constrained thresholding in accordance with a non-limiting example of the present invention.

FIGS. 8A through 8F are graphs showing the sample results for constrained thresholding that includes pooling in accordance with a non-limiting example of the present invention.

DETAILED DESCRIPTION OF THE PREFERRED EMBODIMENTS

Figure 1A:
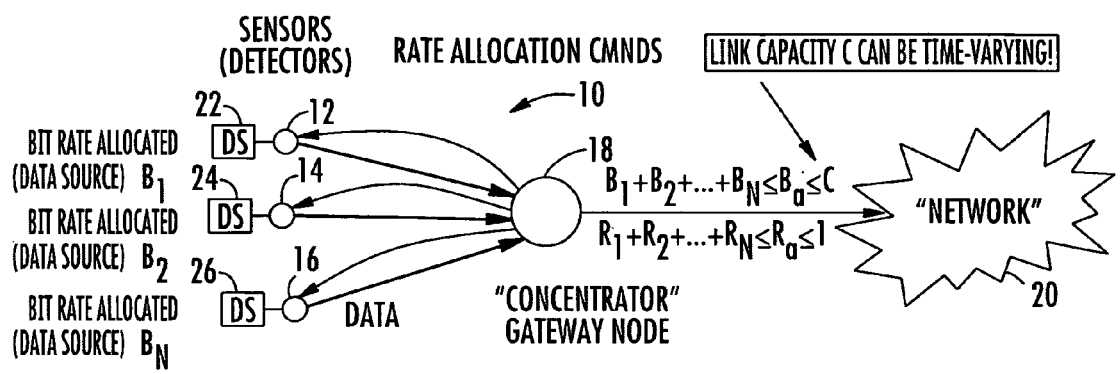
FIG. 1A is a high-level diagram showing three data sources having sensors (or detectors) that communicate through a concentrator gateway node as a multiplexer to a communications network, and showing the rate allocation command channels back to the sensors for controlling an allocated data rate.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited to any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Attention is now directed to FIG. 1, which is a diagram showing a communications system at 10 and three nodes 12,14,16 that communicate with a concentrator gateway node 18 as a multiplexer to a communications network 20. For each data source 22, 24, 26 (e.g., sensors or detectors) in which a bit rate is allocated (as bandwidth) to convey the detected or measured or sensed data corresponding to each sensor as $B_1$, $B_2$ and $B_N$. Rate or bandwidth allocation commands are transmitted back to the node 12, 14, 16 from the gateway 18.

Figure 1B:
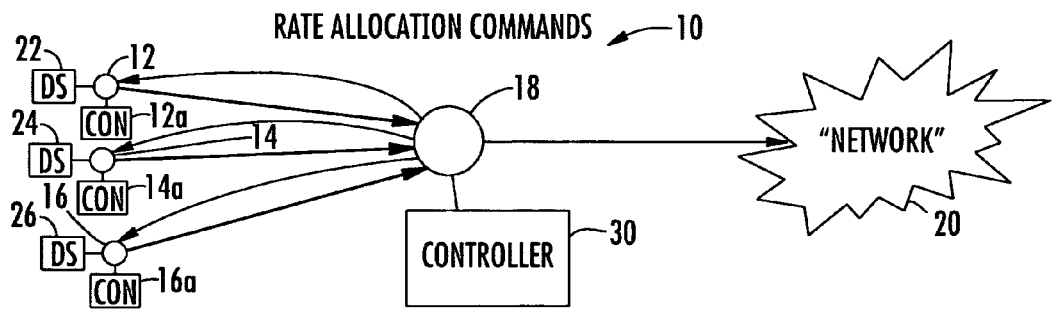
FIG. 1B is a diagram similar to FIG. 1A, but showing a controller connected to at least one of the concentrator gateway node and data sensors to control data generation based on data sensor thresholds in accordance with a non-limiting example of the present invention.

FIG. 1B shows the use of a controller 30 that can issue data rate allocation commands with appropriate programming to control data generation by controlling the thresholds of the data sensors 22, 24 and 26. Each data sensor can have an associated controller 12a, 14a and 16a as illustrated. The data sensors can lower the detection thresholds based on an initial data rate allocation to improve sensitivity of the sensors to signals of interest, such as based on amplitude. The limit to which the threshold can be reduced is typically based on the signal and noise characteristics where "false alarms" may overwhelm the individual links. In short, the scheme described herein using a data prioritization metric of total detection strength (i.e., signal level above a certain threshold, and larger excursions of greater interest). The controller and data sensors together control the data generation rate from data sources and to achieve maximum sensitivity at a global level, in the sense that as long as the data rate per sensor conforms to its allocation the sensors can be made more sensitive. If the controller determines that the thresholds will be lowered below an a-priori minimum threshold setting before the allocated link capacity is fully utilized for a sensor, that excess bandwidth can be redistributed by a central control in the concentrator node 18.

Figure 2A:
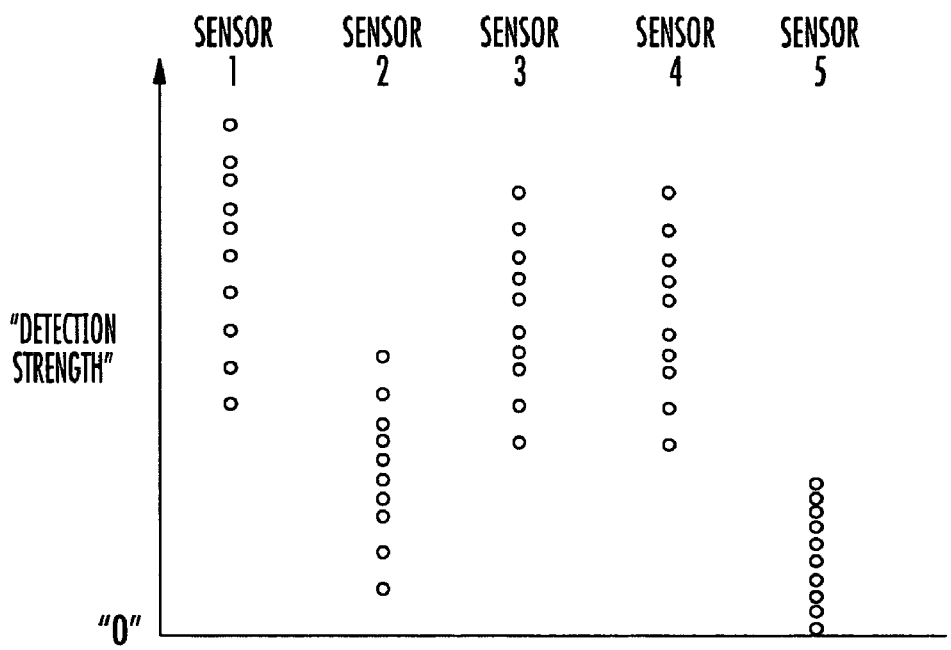
FIGS. 2A through 2E are graphs showing a non-limiting example of five sensors associated with data sources in which the Probability of Detection (POD) per sensor to detect the Signal of Interest (SOI) is adaptively maximized while meeting an overall length data capacity allocation constraint and preserving overall system sensitivity with detections above a threshold maintained until retrained in accordance with a non-limiting example of the present invention.
Figure 2B:
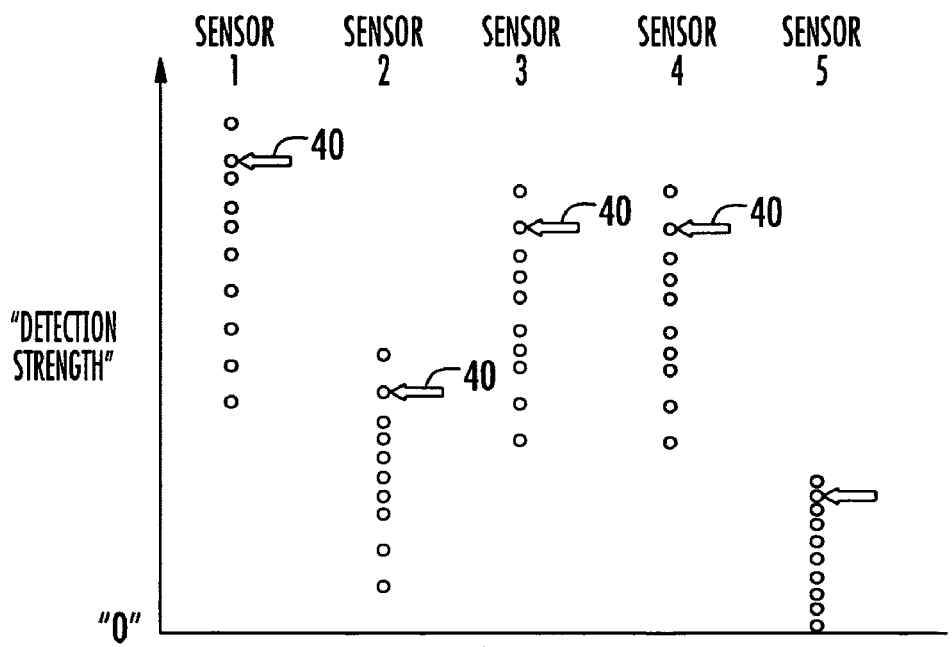
Figure 2C:
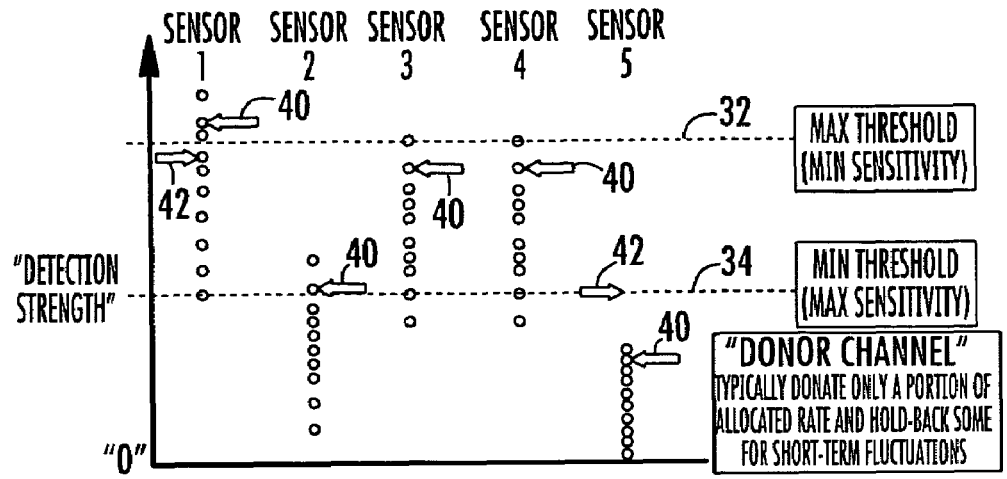
Figure 2D:
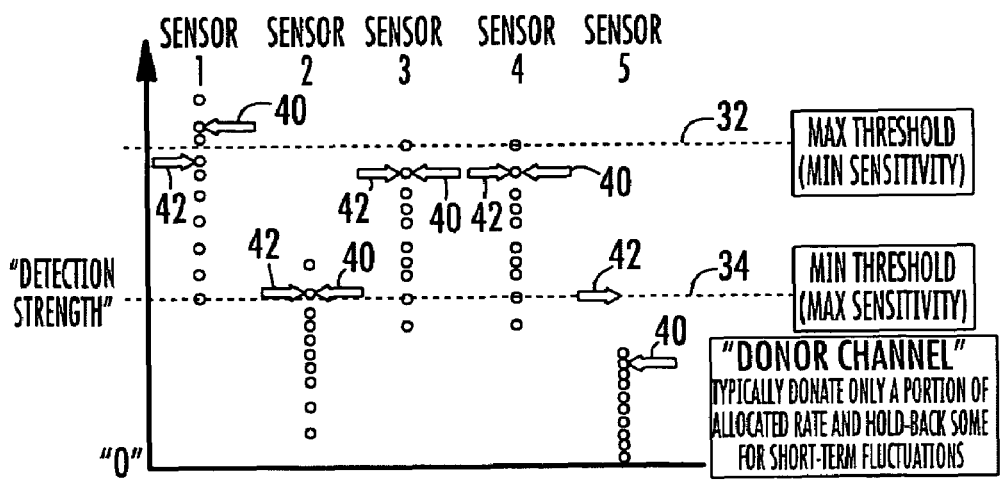
Figure 2E:
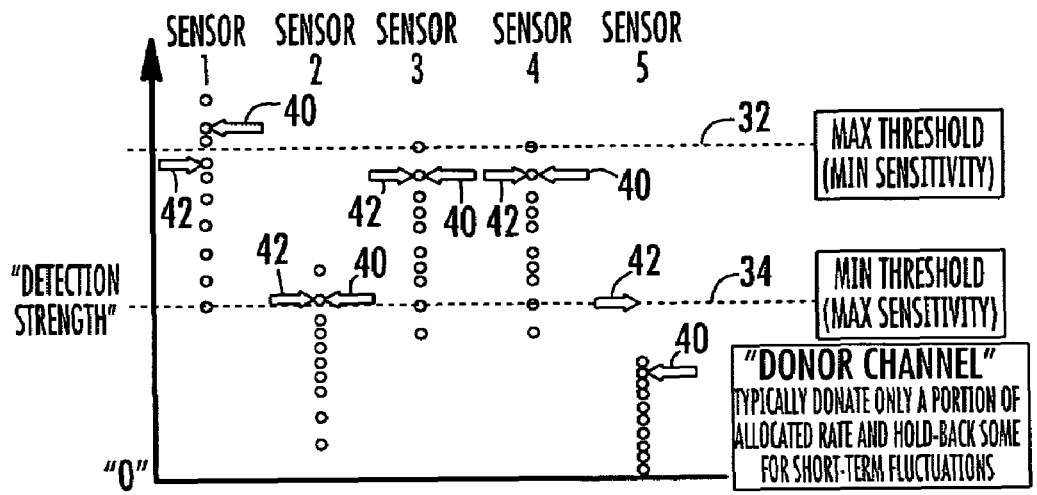

FIGS. 2A through 2E are graphs showing an example of a system with five data sensors labeled as data sensors 1-5. As shown in FIG. 2C, each sensor has been allocated a maximum threshold shown in the dashed line 32 (which implies the minimum sensitivity for a sensor) and a minimum threshold in the dashed line 34 (which implies the maximum sensitivity for a sensor). These limits would be set on a case-by-case basis. The essential detail is that there are two settings (which may be different for every sensor deployed) that set the smallest signal of interest to be detected (line 34) (i.e., the minimum detection threshold or maximum sensitivity) and the maximum threshold of for signals of interest (line 32) to be detected (i.e., the desired minimum sensitivity for the detector). It is possible in certain applications that the maximum threshold is set by the upper end of the sensor dynamic range and is set the implicitly by the sensor design.

The detection strength is illustrated on the vertical axis with detection strength of individual detections shown by the dots. In this example we define that detection strength, that is the signal level above the threshold, is the metric of utility for the data. The larger the threshold crossing, the more important or useful the data to the centralized processor. We have not defined what is being detected, as the parameter could be a scalar value of any measurable property (e.g., amplitude, brightness, temperature, frequency, pulse width) or a detector could be designed for vector valued (i.e., combinations of parameters). Certainly any multi-node system may contain some of each detector type.

To quantify "detection strength" the concept of a distance or norm (i.e., length in mathematical literature) is needed. A consistent method is to use Euclidean distance between the vector of measurands and vector of threshold levels. Then in the case of a scalar value the result is simply the amplitude of the threshold crossing. For greater flexibility where it might be desirable to weight some variables more than others in the detection metric, the well-known Mahalanobis distance could be used.

Continuing with FIGS. 2A through 2E, we now describe how the data adaptive thresholds are set during a training period, and summarize how the allocated link capacities are met.

In the training instance shown each sensor (detector) corresponds to a user of a communications device in this example and data source. In the non-limiting example shown, each detector has ten detection opportunities and each opportunity has resulted in a measurement. Also we assume for simplicity of presentation that each detection generates a fixed size packet containing the detector data. In practice the data packet sizes can be of variable length, but the statistics of packet length will need to be accounted for to make optimal use of link resources.

We also consider for simplicity that the detectors are synchronized so that the all collect their respective data simultaneously. These assumptions are solely for ease of presentation and are not an operational requirements. In practice any number of detections can be used in a sensor and the number of detection opportunity per sensor need not be equal, but simply known, however, the main proviso is that the number of detections in each sensor carry a statistically significant sample of the underlying population it is to detect. Hence the training data well represents the population data. This is a typical assumption and requirement of most adaptive systems.

It is important because the training data will be used to reset the detection thresholds and reallocate communication bandwidth for an interval of time until retraining is initiated. Adapting the system control parameters on "outlier" or data that is not statistically significant will yield unsatisfactory performance.

To operate the detectors when the training set used is no longer representative of the underlying population a number of well-known (but application dependent) methods can be used (e.g., congestion at one or more sensing nodes, lack data transfer from one or more nodes, etc.), those skilled in the art will appreciate which methods might be applied in a particular application.

Continuing the non-limiting example shown in FIGS. 2A through 2E, the system designer has five sensors with communication nodes, which connect to a single concentrator of capacity C. The system design initially allocates equal capacity to each sensor thus each sensor receives an initial fractional rate allocation of 1/N (N=5) or 20% of the overall link capacity C (i.e., C/N=0.2).

We further assume for illustration, that the link capacity is likely not sufficient to carry all the potential detections from all the sensors. Hence it is known at the outset that some detections must be rejected from being transmitted. Considering the designer has knowledge of the link data rates available, the number of detection opportunities per unit time per sensor, and the number of sensors, then for example it can be determined say that the concentrator link can only service say 80% of the sensor data load (L=0.8). The question remains how to allocate that capacity, using the training data, to maintain maximal utility.

The first step is to set the initial thresholds in each sensor. Assuming there are 10 detection opportunities (D) per sensor in the training interval and there are N (N=5) sensors, with each sensor a priori allocated 20W (i.e., 1/N) of the link capacity C, then the initial threshold (T) in each channel for detection activity is set at T=D*(1−1/N). Where the threshold can be considered the index of the detections rank ordered. In this example, D=10, N=5, so T=10*(1−0.2)=8. This threshold is shown as arrow 40 in the diagram.

The next step is to compare the thresholds against (optional) operator limits. The limits are shown as lines 32 and 34. The system designer may decide, for example that detections below a certain value indicated by line 34 are of no utility, hence a channel threshold will not be allowed to adaptive below a certain value.

Conversely, the threshold will also not be allowed to adapt above a certain value (line 34) because a certain sensitivity must be operationally maintained. Thus comparing the initial data thresholds to the limits, the individual sensor thresholds are set at the arrows 42. Two effects must be noted.

First, is that if these thresholds are set sensor 1 will exceed its rate allocation (i.e., it should be allocated only 2 detects and 3 need to be sent if the arrow 42 is used as the threshold). However, this effect is mitigated by sensor 5. Sensor 5 has all its data below the maximum sensitivity so in effect all the data for sensor 5 would be disregarded by the downstream processing system (as unimportant), so the local nodes would not even send the detection information.

Hence a "donor pool" of bandwidth can be created. Of course it is not wise to absorb all the currently unused capacity of sensor 5, however, some may be taken and reallocated where needed. The link capacity available from the (underused) sensor 5 allocation can be divided into two equal pieces. Half is kept in reserve, say for channel 5 should conditions change, and the other half is donated (or borrowed) by sensor 1 to be able to lower its threshold into the operationally required region.

In this simple and non-limiting example all the essential elements have been shown step by step. Many variations for creating the reserve pool of capacity and reallocating the capacity amongst sensors is possible. However, the overriding novelty is that the reallocation of the capacity is made to globally maximize detector sensitivity by adapting thresholds in the detection process and not say by inspecting data labels in preformed packets.

Figure 3:
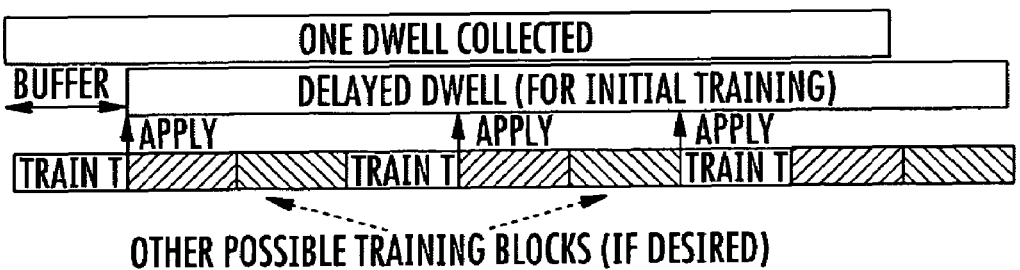
FIG. 3 is a chart showing preprogrammed, i.e., periodic retraining within a dwell period and data delayed by 1 dwell period in accordance with a non-limiting example of the present invention.

FIG. 3 is a chart showing an instance of how training for the detection thresholds may be implemented. In this non-limiting example a preprogrammed periodic retraining interval within a dwell is used. As an example in a surveillance system a dwell period may correspond to a cell in space-time-frequency also illustrated in the FIGS. 4 and 5. As shown in FIG. 3, a dwell may also be further sub-divided into blocks (an example is shown) where periodic retraining maybe desirable depending on the expected environmental dynamics. The periodic retraining per dwell is show as 3 blocks. However more frequent retaining maybe used if desired, and it would be desirable if there are significant variations (e.g. non-homogeneity or non-stationarity) of operational characteristics within a dwell. Also, less retraining intervals may be used if desired, for example if the operational characteristics are homogeneous across space-time-frequency cells.

However, it is strongly suggested that at least one training interval be used per dwell. This is illustrated in the figure where the first block of data is used to compute the thresholds that will be used until the next training interval. The sensor system also buffers the data collected until the end of the training interval. This way once the thresholds are computed, they can be applied to the entire data collect. If the system designer is willing to "throw away" some data then the training block can be neglected for detection purposes.

The size of the training block is dictated by collecting a statistically significant set of measurement data and hence may not be the same length of time for all implementations. We illustrate the case where each block is of the same size.

The periodicity of re-training can be pre-programmed as illustrated or can be indicated by exception detection in the control processors in the network (e.g., congestion detectors, buffer overflows, etc.).

It is also conceivable that the training data need not be taken from one continuous set of samples. There are statistical sampling methods that could be employed if the user wished to address the added complexities of pooling all the collected data and training over a larger pool using statistical sampling methods (e.g., cross-validation). However, in practice the utility of such approaches is questionable.

Figure 4A:
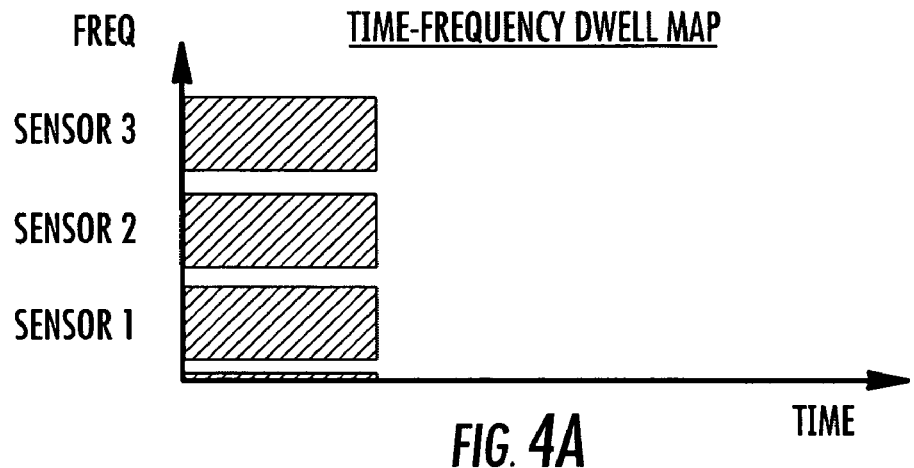
FIGS. 4A through 4C are bar charts showing a sensor time-frequency mapping in accordance with a non-limiting example of the present invention. The system operates as a synchronized sensor system similar to a multi-channel spectrum monitor over a specific spatial field of view.
Figure 4B:
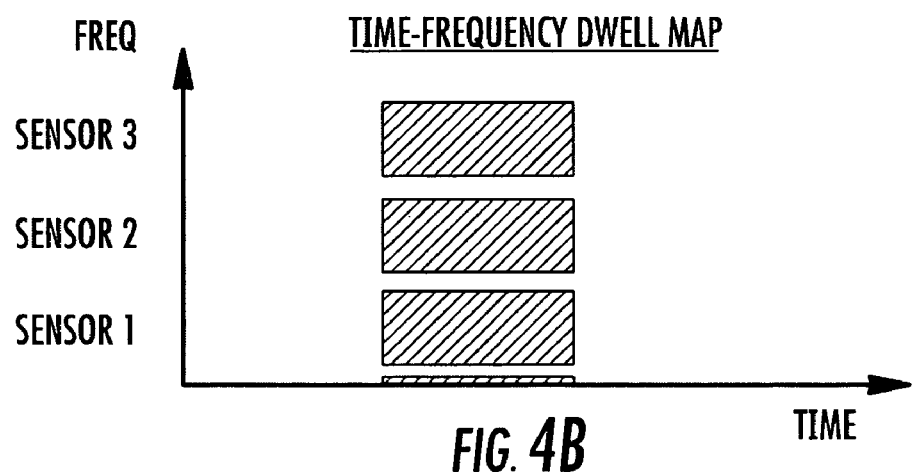
Figure 4C:
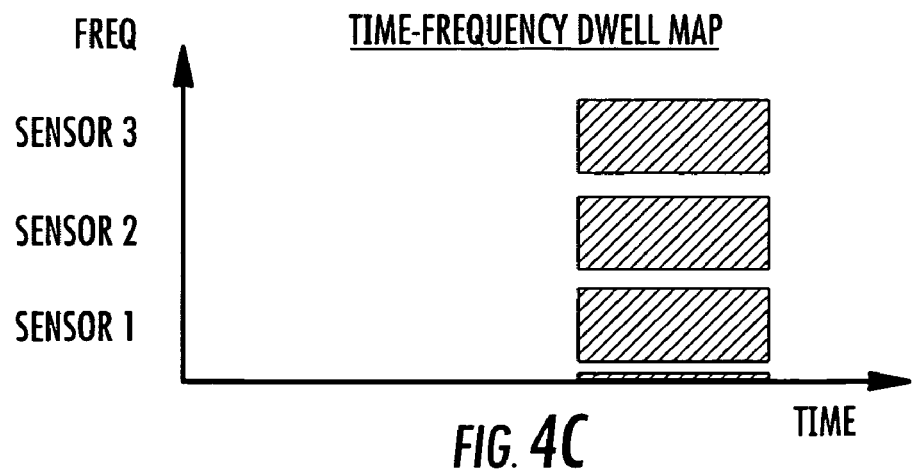

FIGS. 4A through 4C show time-frequency dwell maps for the example shown in FIGS. 1A and 1B with the three data sensors and the allocated bit rate $B_1$, $B_2$ and $B_N$.

Figure 5A:
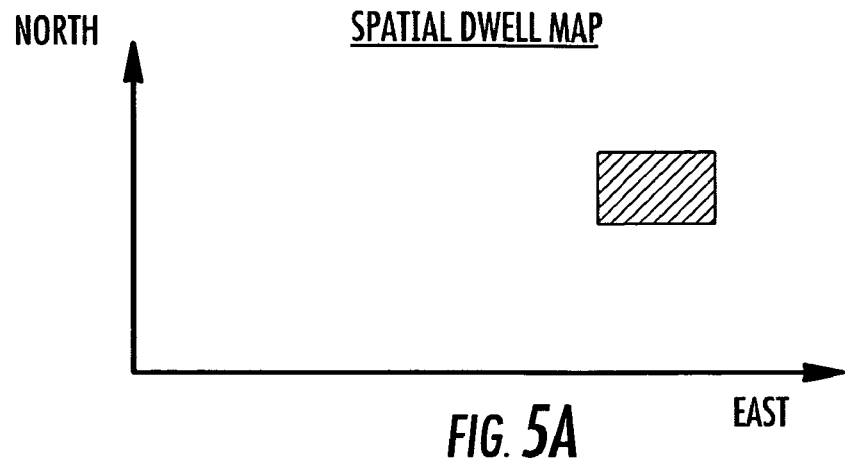
FIGS. 5A through 5C are graphs showing the spatial dwell mapping in accordance with a non-limiting example of the present invention. The system operates as a synchronized sensor system similar to a multi-channel spectrum monitor, and the time history of the fields of view (e.g. system footprints) are illustrated.
Figure 5B:
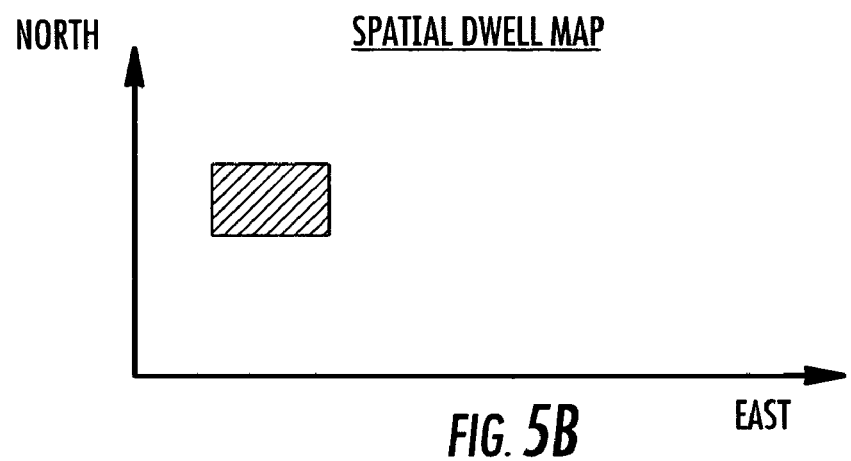
Figure 5C:
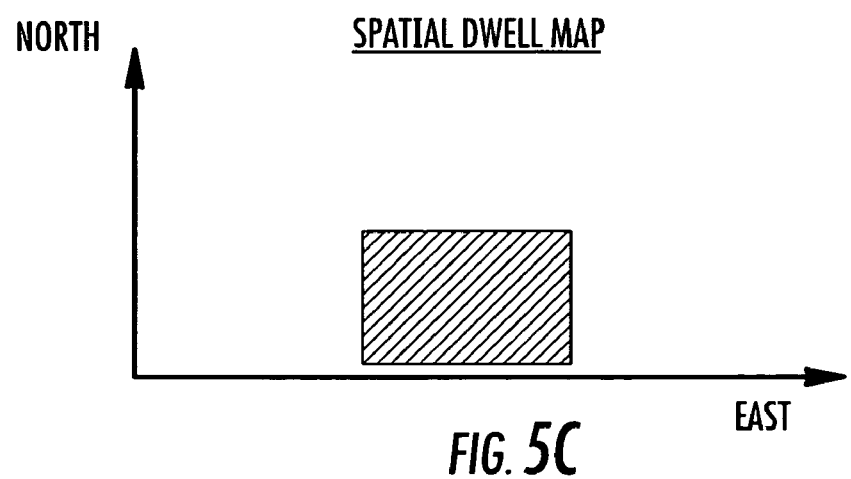

Assuming the case of a spectral monitoring system over some geographic area we show the suburb, rural, city classification on the lower axis corresponding to a similar classification in the spatial dwell map of FIGS. 5A through 5C, indicating that the thresholds are not just frequency dependent as in FIGS. 4A through 4C, but also space and time dependent as in FIGS. 4A through 4C and 5A through 5C, such as for systems with steerable antenna beams. Hence there would be a training sequence for each space-time-frequency dwell. And in each dwell, the overall data rate constraint from the individual time-frequency detectors can be met through data adaptive threshold changes for frequency and space and time. The rectangular blocks in the spatial dwell map could correspond to a rural area (R) with few transmitters, a crowded city (C) having numerous cellular telephones or transmitters, and a less crowded area as within a suburb (S).

In accordance with a non-limiting example of the present invention, the system and method is an improvement over statistical multiplexing, which is a type of link sharing that adapts to the instantaneous traffic demands of the data streams. The system reacts to the collected data and does not use a priori statistics in order to obtain the best sensitivity and meet the link capacity. The system initially provides a reservation for each data source on the shared communications link and can use reservation protocols to obtain a data rate allocation.

The detectors (sensors) as part of the data sources set their individual detection thresholds to meet the initially allocated data rate such as during a training interval interspersed with data collection using an order-statistic approach. This is shown in the graph of FIGS. 2A through 2E with the arrow 40. It is possible to use an order-statistic by ranking based on amplitude to measure total activity, allowing the smaller amplitude signals to remain.

The data sources clip the threshold between a minimum and maximum value. The minimum value can set the maximum sensitivity the data sensor can achieve, while the maximum value can set the minimum sensitivity the data sensor may achieve. That number can be set as infinite.

Each data sensor reports its rate demand/reserve to the concentrator/multiplexing node 18 shown in FIGS. 1A and 1B, which can reallocate excess data capacity from any channels that are underused. Upon receipt of a data rate allocation, the detectors (sensors) compute a new threshold based on the order statistic for data generation at or near the prescribed rate. Each data sensor (detector) will retain some control capacity to the multiplexing node to indicate any exception conditions such as the deviation from training conditions. It is possible to reserve some capacity in the channel.

Data prioritization can be measured by the total detection strength, indicating that larger events are "of interest" such as based on amplitude. The pooled capacity allows any active data sources to lower their thresholds based on an initial data rate allocation to improve sensitivity to lower amplitude events. The pooled capacity allows the data sensors to lower the initial threshold based on their data rate allocation that is initially given to allow the sensitivity to lower amplitude events. Once the system determines the threshold of individual channels, if one user is not using the allocated data rate, it can be turned into the other data rate or pooled capacity.

Figure 6:
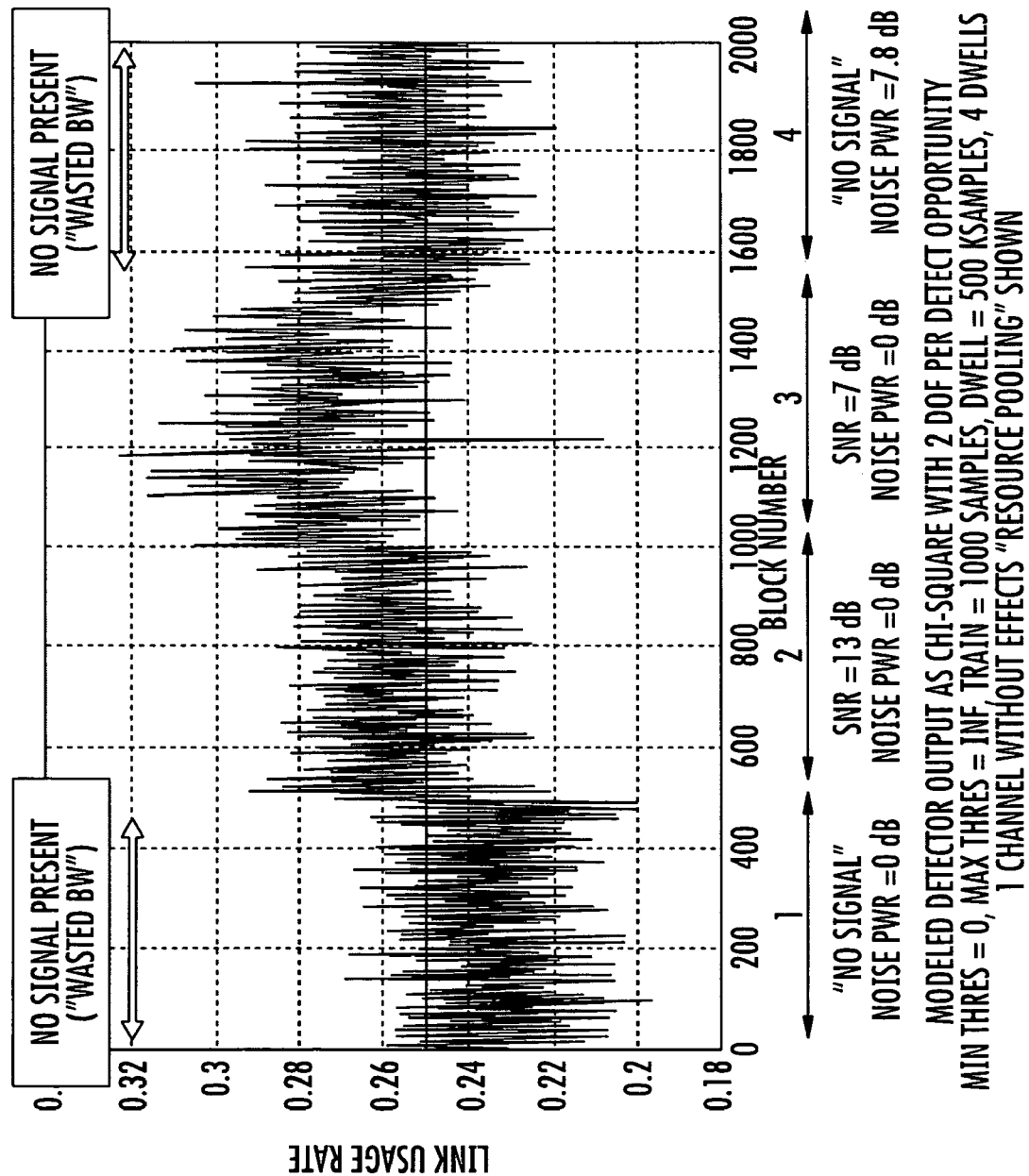
FIG. 6 is a graph showing the sample results for unconstrained adaptive thresholding in accordance with a non-limiting example of the present invention.

FIG. 6 is a graph showing sample results from an unconstrained adaptive thresholding with four different major block sets (where a major block is a dwell in the nomenclature above). The duration of each major block set is indicated by the arrows 1-4. Each major block set corresponds to 500,000 samples. Each major block of 500,000 samples is sub-divided into 500 non-overlapping 1,000 sample sub-blocks. Where the first 1,000 sample sub-block in each major block (i.e., dwell) is marked for training. All the data for the non-limiting example simulation was generated as a DC level (A) in additive white Gaussian noise and the detector used is a square-law device.

The unconstrained operation illustrated in FIG. 6 means that no user set minimum or maximum sensitivity is set (i.e., a minimum threshold is 0 and a maximum threshold of infinity is implied). Hence the detector threshold is completely data adaptive. While this operational mode is possible, as will be discussed it be less desirable than the data adaptive thresholding with user threshold limits as described with FIGS. 2A through 2E. The main motivation for FIG. 6 is to later illustrate the benefits of threshold limits as part of the novelty of the invention.

As described, the first 1000 samples of each 500,000 sample block are allocated to training. Say in this example the sensor operation was allocated a link usage of 25% (0.25). At the first block set, there is no signal (A=0). The noise power is zero decibels (dB) (or 1 unit of power, say 1 Watt). The link usage parameter is the link usage per sub-block defined as the number of threshold crossings divided by the number detect opportunities per sub-block. Thus, Link Usage Rate=# detections/1000.

The graph indicates how much of the communications link the channel is using per sub-block. The target is 25% (which is the initial user allocation). The average link usage is about 23% (due to some statistical variation), but this data wastes bandwidth since no signal (A=0) is present. Also in block 4 there is no signal present (A=0), but the noise level has increased. Again, in block 4, the first 1000 samples are used for training, and the detector usage is approximately the 25% target. However, again there is no signal present so this represents wasted bandwidth. The second and third block sets have a signal present, and each block has a different signal to noise, but as can be seen the data adaptive nature of the threshold provides a nearly constant link usage rate of nominally the target 25%.

The 25% usage rate could be say if there were 4 detectors all sharing link capacity C. Further this graphic illustrates a fact that must be included in practical design. Note that in blocks two and three after training the link usage is not exactly 25%. This is despite the fact that the threshold setting algorithm will select exactly 25% in the training block. This is due to statistical fluctuations between data in each block. Two approaches to mitigating this effect are immediately evident. Method one is to increase the size of training blocks to reduce variability, however, this option may induce unacceptable latency in real-time systems. Method two is to reserve some additional link capacity say R, so short-term sub-block variations due to statistical fluctuations in data. This method is more amenable to real-time implementations; however it does sacrifice some available bandwidth. Other options are obvious to those skilled in the art.

Figure 7B:
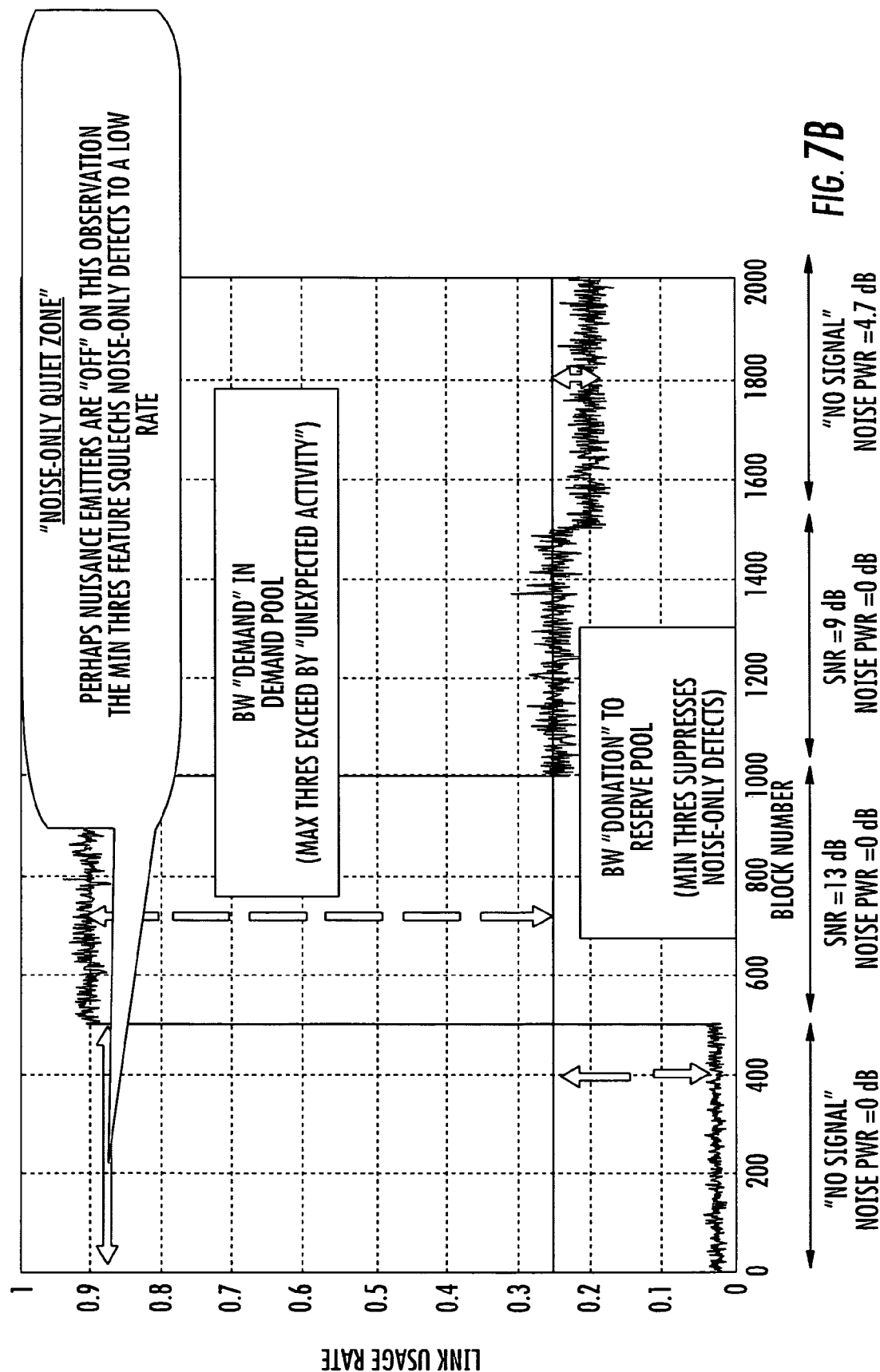
Figure 7C:
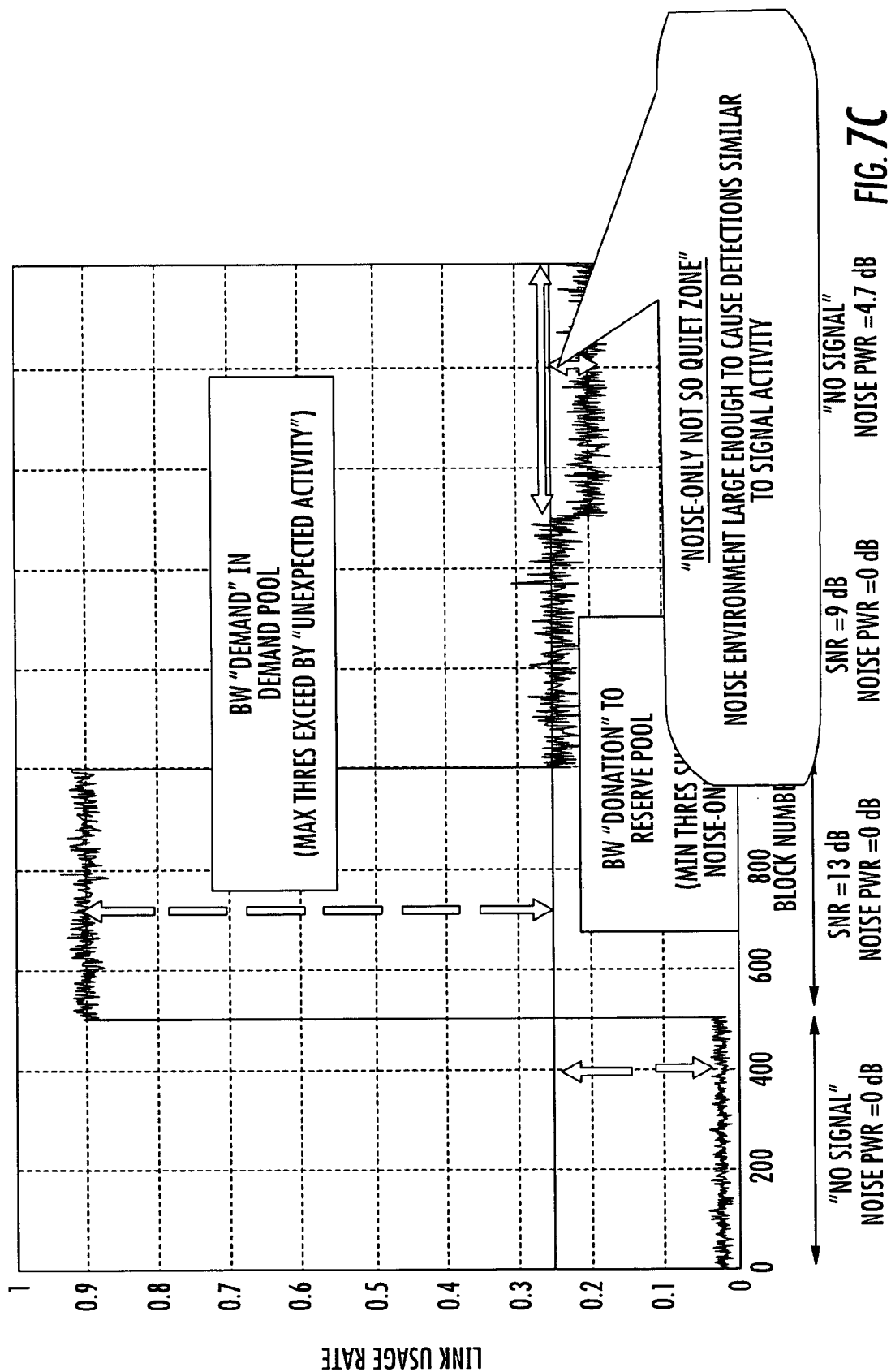
Figure 7D:
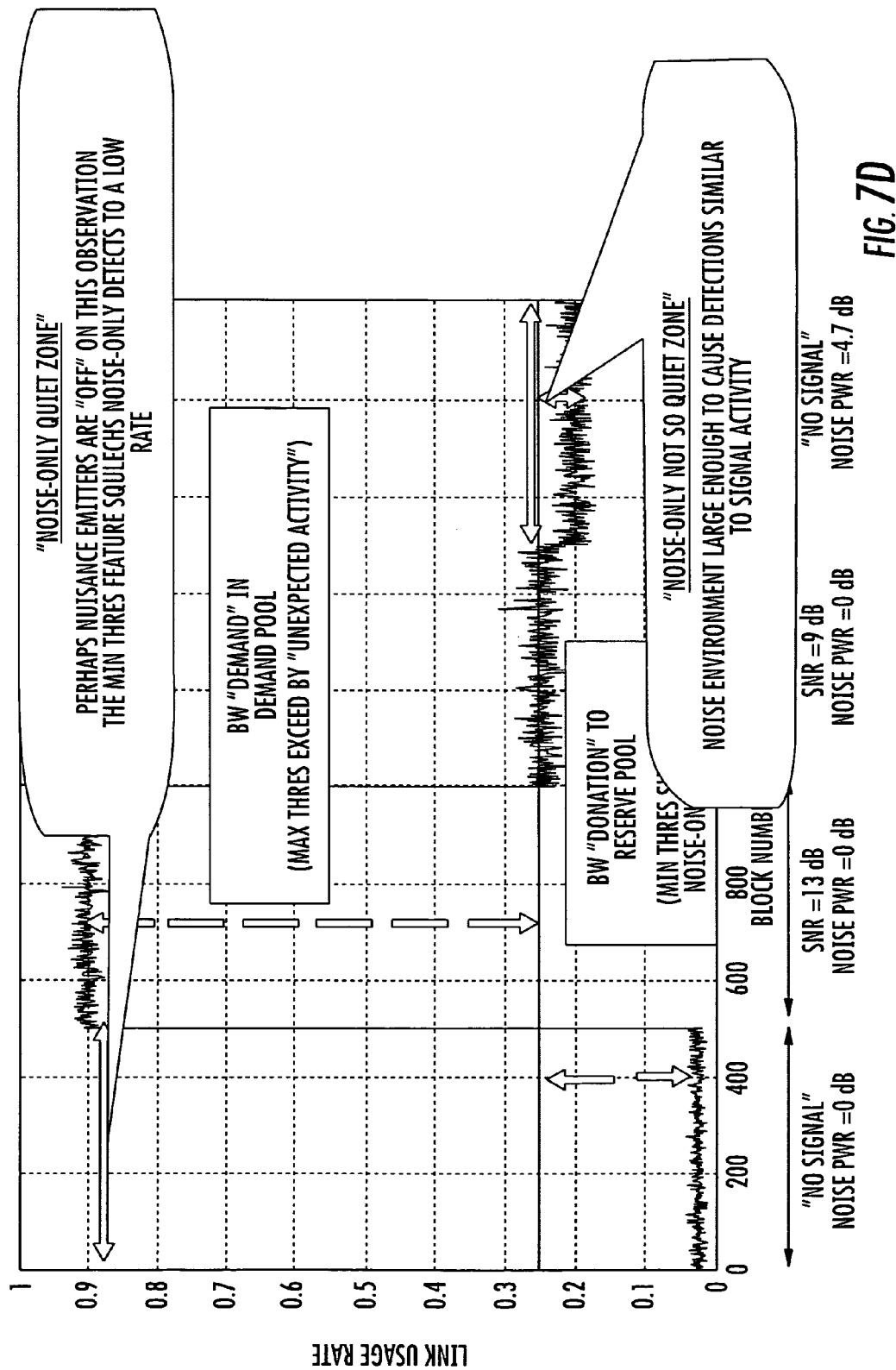
Figure 8B:
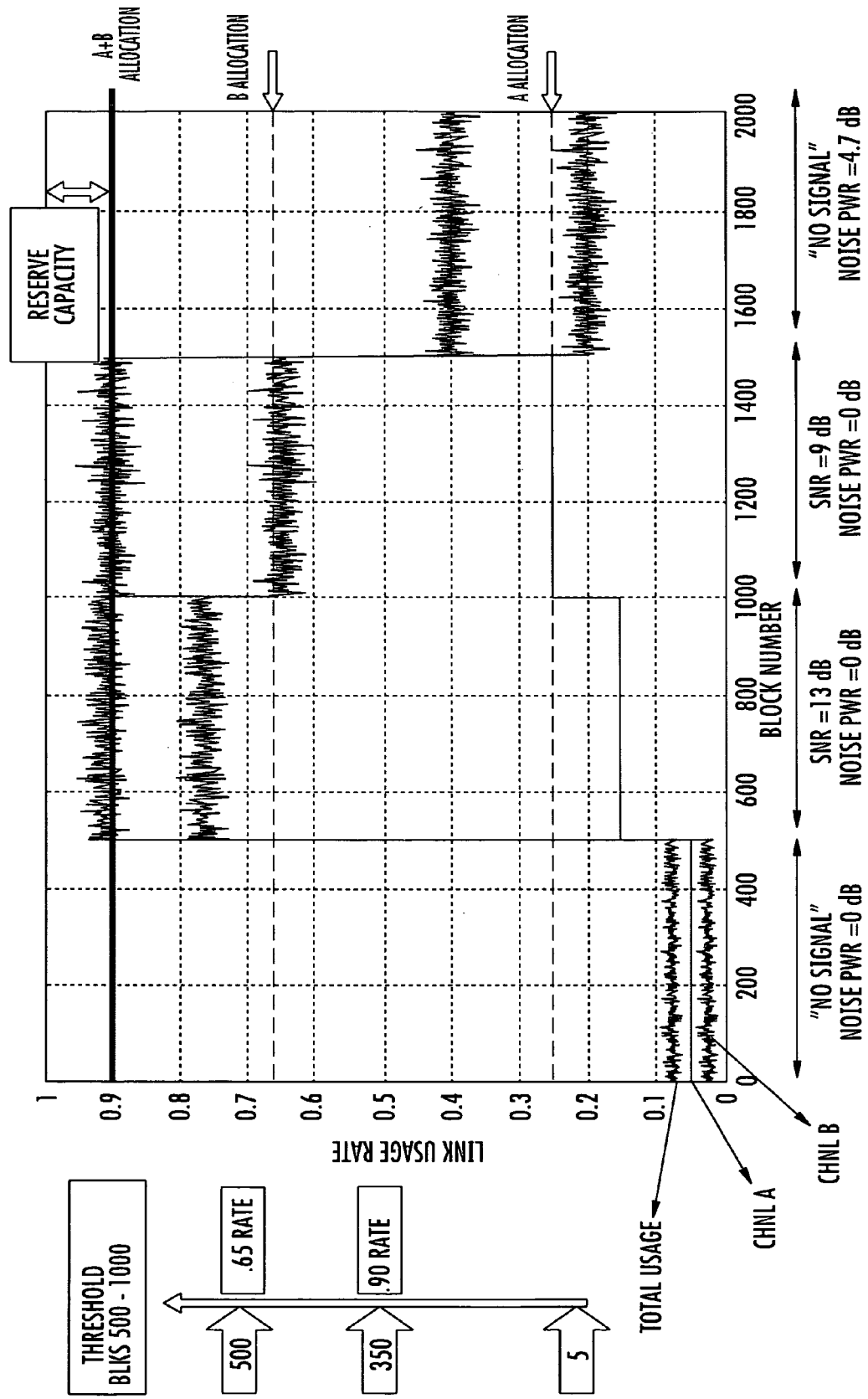
Figure 8C:
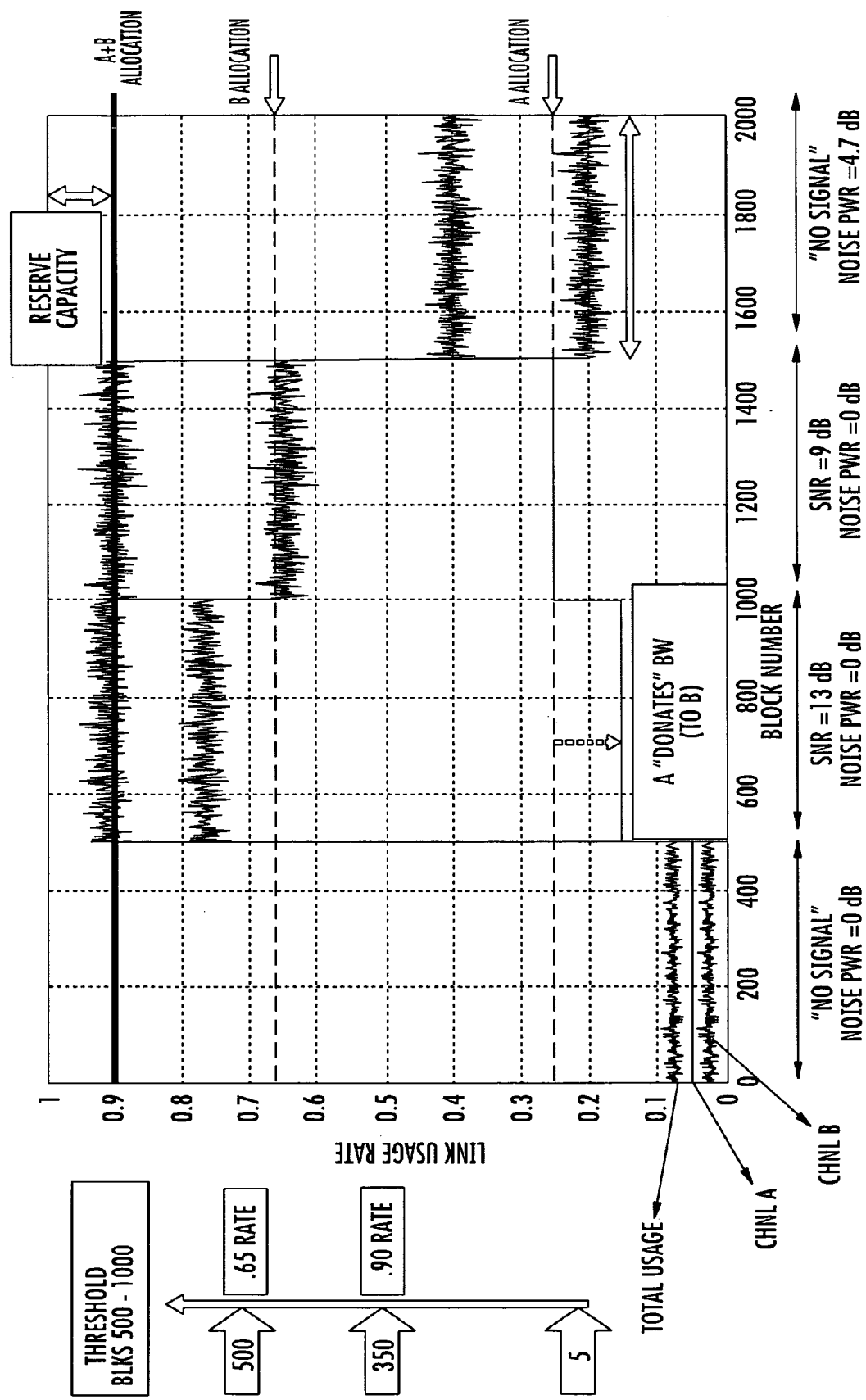
Figure 8D:
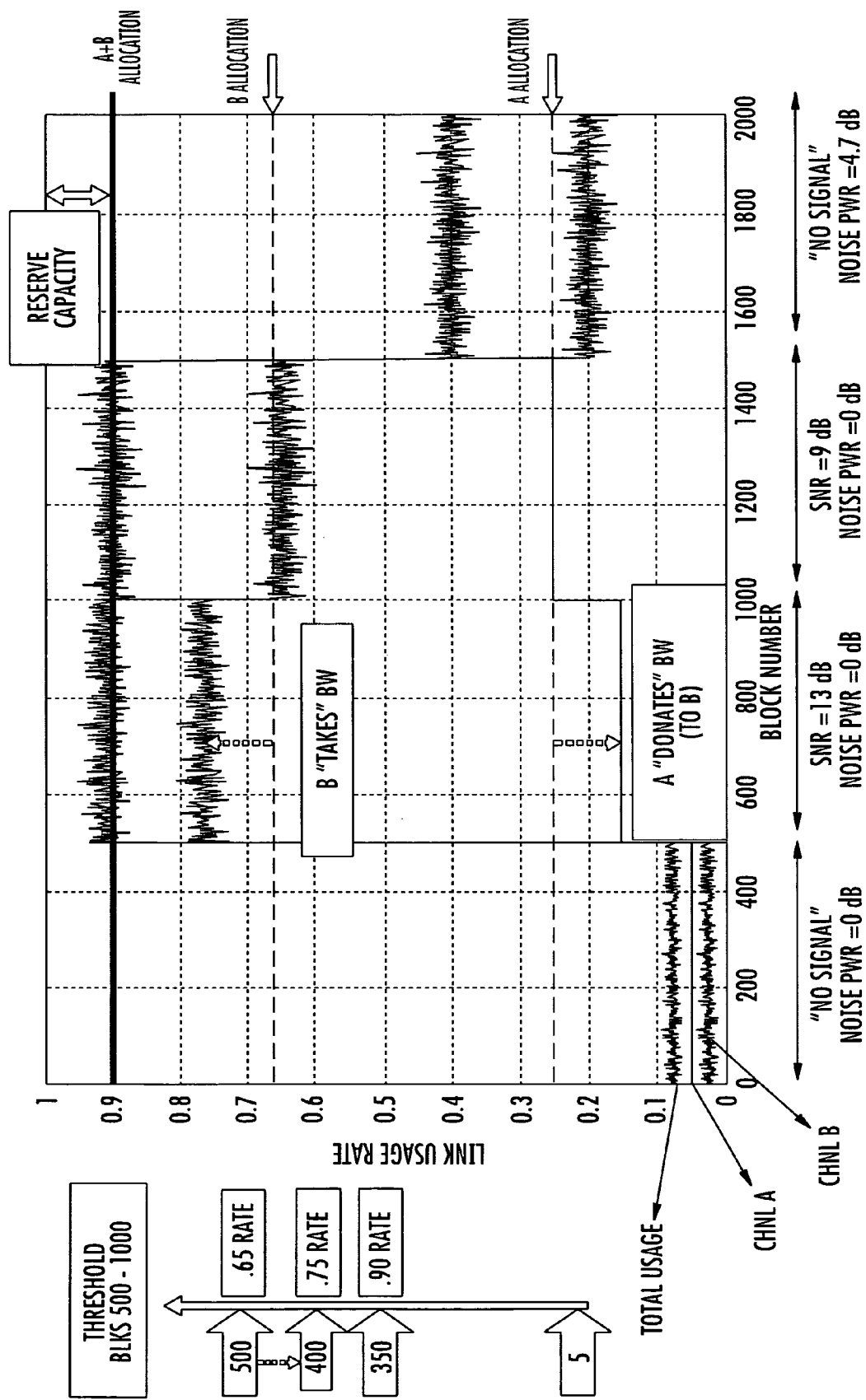
Figure 8E:
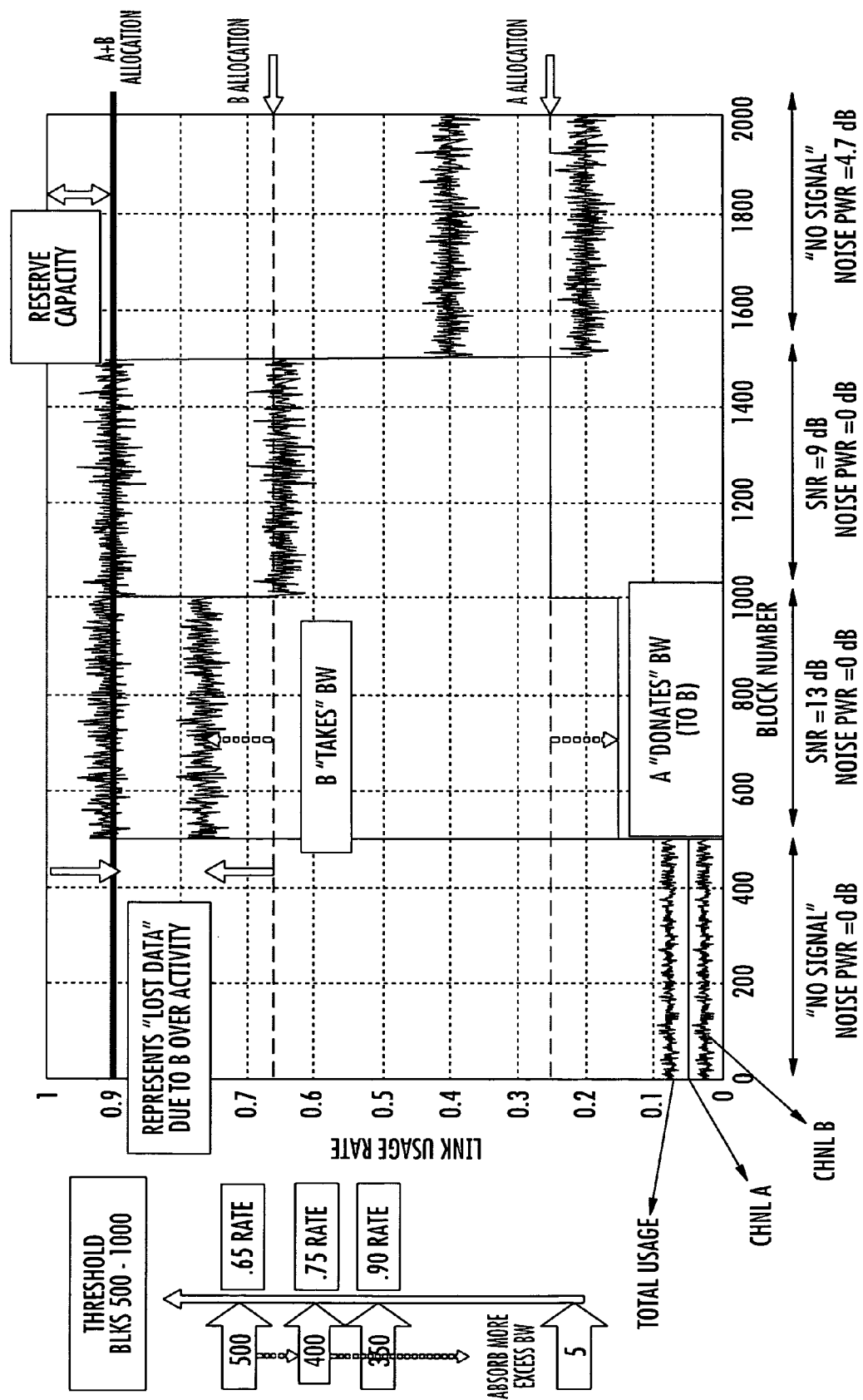
Figure 8F:
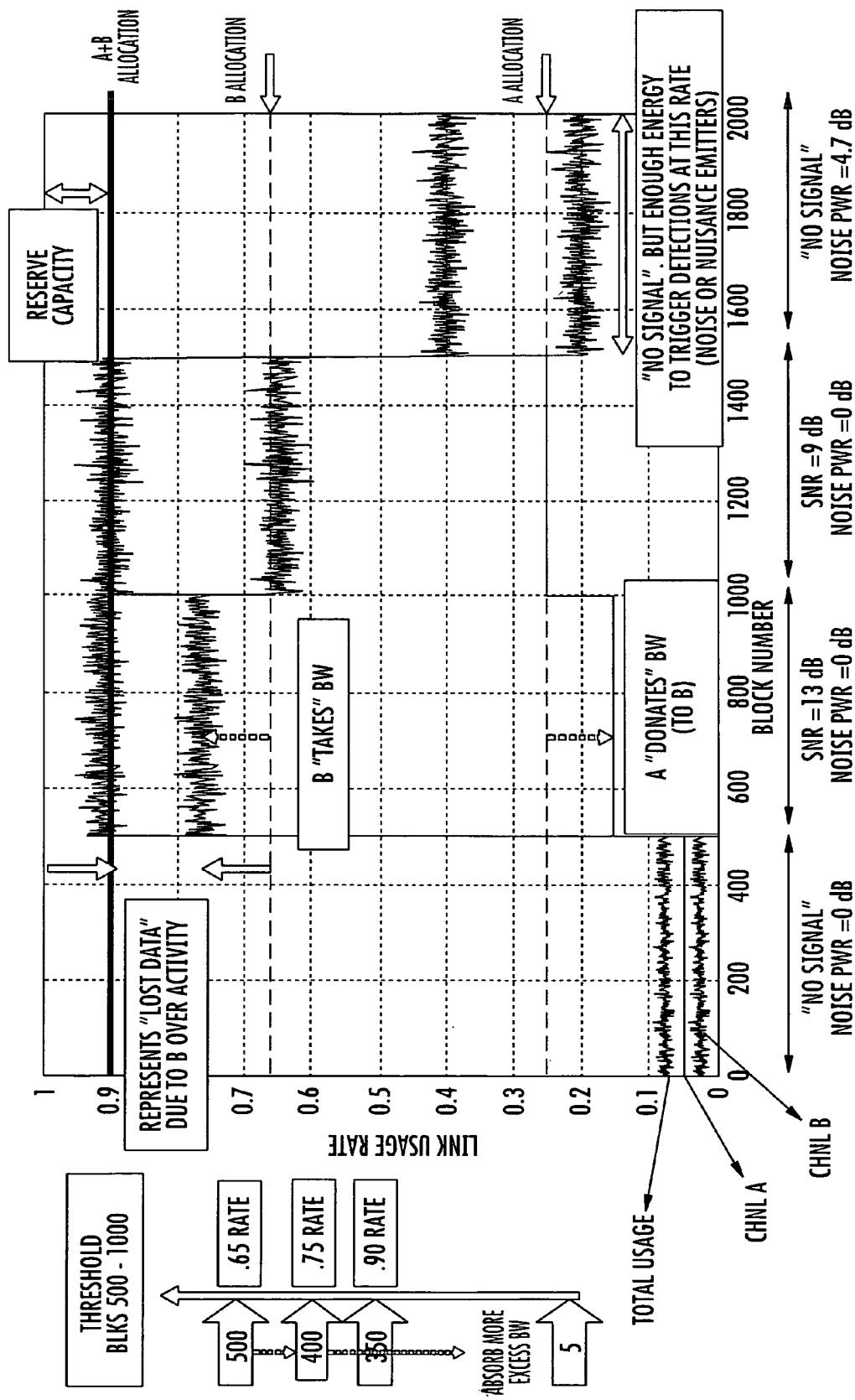

FIGS. 7A though 7D show the sample results for a constrained threshold with a data sensor. In this case the training thresholds are checked against user limits (as in FIGS. 2A through 2E). The user limits in this non-limiting example are fixed for all time and set as minimum threshold of 5 and maximum threshold of 350. Again the data is generated as a DC level in additive white Gaussian noise strictly for simplicity. The major blocks are 500,000 samples, sub-divided into non-overlapping sub-blocks of 1,000 samples. Training is performed on the first 1,000 sample sub-block. Again the target allocation is 25%.

In the first block set, there is a link usage of about 5%. Thus the minimum threshold has "squelched" the detections passed by the previous unconstrained threshold system. The ~20% link capacity under use can be donated into a pool for reallocation to other more active sensors in this block. In block 2, the detector retrains. And at the signal level currently detected the threshold of 350 would load the channel with a usage rate of 90%. Clearly, exceeding the 25% initially allocated by the designer. However, in this instance the detector would "pull" or "borrow" from the pool to try and reach the demand rate of 90% (which implies the threshold could be maintained at 350 which is a desired minimum sensitivity in this non-limiting example).

If there are insufficient resources in the pool, then an error flag would be generated indicating incomplete data is available and that the maximum threshold for the data sent is above the maximum acceptable level (in order to reduce data flow rate). On the other hand if there is more than sufficient resources, then the threshold might be able to be reduced below 350 (but not less than 5) possibly allowing all the channel activity to be communicated.

In other words the 90% link usage was derived considering a threshold of 350 that resulted after training and comparison against the limits. As the threshold level is raised then the channel usage drops, and as the threshold is lowered channel usage can increase if the lower threshold corresponds to more detection events (i.e., lower amplitudes that were originally rejected are now accepted).

Block set 3 is a set where the sensor is operating right at the predefined capacity so it would neither donate nor borrow any capacity.

Block set 4 is again a block with no signal present (A=0). However, in that block there is about 3 times the noise power than block 1. Retraining in block 4, results in a threshold somewhere in the [5,350] range. And in this block only 20% capacity is used, and 5% can be donated into a resource pool for reallocation.

The essential detail illustrated is how the retraining, data adaptive thresholding at the detector level, and resource pooling amongst nodes can be used together to allocate bandwidth where valid data demands capacity and conserve bandwidth where it is less likely that the data to be detected has interesting features.

FIGS. 8A through 8F are more complete non-limiting examples, showing sample results with the constrained threshold and pooling. As a generalization for this example, two channels are used, and each is given an unequal link allocation. Channel A is given 25% of the link and channel B is given 65%. The remaining 10% is kept in reserve and can dynamically allocated in real-time as needed according to some user defined and application dependent rule. Again there are 4 major blocks, each of 500,000 samples. Each major block is sub-divided into 1,000 sample non-overlapping sub-blocks. The first sub-block in each major block is assigned for training. The data on channel B collected is again a DC level in additive white Gaussian noise. For simplicity, we illustrate channel A as a level of constant activity. In practice there will be fluctuation of activity on the A channel, however including this here only adds unnecessary complexity to the presentation. Also shown on the graph is a "top trace" which represents the total capacity usage at any time (i.e., the capacity used by channel A plus the capacity used by channel B).

In the first block, there is no signal (A=0) for channel B, so again there is some small amount of link usage due to noise-only detects. In this block both channel A and channel B could be marked a bandwidth donors. However, with just two channels this is unnecessary.

In block two, channel B now has significant detection activity. The threshold retrained as indicated on the first 1,000 sample sub-block. And applying the 350 threshold limit, then channel B would "demand" 90% of the link capacity. Since channel A is already using 15% of the link this would be impossible. And channel A is guaranteed and link usage below the 25% allocation. In essence the initial allocation by the designer is a quality of service guarantee. But channel A can donate the remaining portion of it capacity not being used (along with any other under used channels in a multi-channel system). Channel B would make a capacity request to a central resource controller (along with any other overburdened channels the might exist in a multi-channel system) in the concentrator (see FIGS. 2A through 2E). In this case say the controller grants channel B all the excess capacity. Thus, channel B can now use 75% of the link capacity. This requires that channel move its data adaptive threshold (i.e., to 400 in this example) beyond the threshold limit top (i.e., 350 in this example) to meet link capacity constraints, and an error warning would be generated within the network for block two. It would be possible, if desired to also allocate some or all of the reserve capacity to channel B, this would allocate another 10% of link capacity to channel B, allowing it to temporally have 85% of the link capacity, which would be almost the 90% currently demanded, and thus preserving all the data detected as interesting or useful.

In block three, channel A has used it 25% allocation, and channel B is using its allocation of 65%. Hence there would be no borrowing or donating (in a two channel system). In block four, both channel A and channel B are under used so they could be donors. In this block the data adaptive threshold and lower threshold limit of 5 work together to suppress noise-only detects.

As shown in FIGS. 8B-8F, there is a reserve capacity above the allocation for channels A and B. This capacity may be parsed out dynamically under some rules to help overburdened channels cope with dynamic overloaded conditions. Many possible rules exist for allocation of the excess capacity and also how much to reserve as excess capacity and designers will make this decision on a case-by-case basis.

The system and method, in accordance with a non-limiting example of the present invention, provides a guaranteed minimum access per data sensor to a communications medium unlike random access protocols, for example, dynamic bandwidth allocation and statistical multiplexing approaches, including Demand Assignable Multiple Access (DAMA), Dynamic Bandwidth Assignment (DBA) and Bandwidth On Demand (BOD), which all manage traffic flow and not the generation of data. The system looks at the quality of the data as compared to a bandwidth on demand system that is based on volume data delivery.

The link capacity C as shown in FIGS. 1A and 1B can dynamically control the data sensor detect threshold to enhance the data source rates. There could be a provision for a "tax" or "cost" per detection to be carried on a communications link among different sensor types, e.g., video, still or on/off, pertaining to summary data that conveys the detect for downstream use. The probability of detection under $H_1$ or $H_0$ is not required to set the detection threshold. The system is robust in a wide variety of scenarios and functions well in the non-Gaussian or unknown environments. The system avoids complicated computations for estimation of signal and/or noise or threshold.

Thresholds can be set and determined non-parametrically and be data adaptive with an order-statistic based system with the data ranking signal amplitude or a likelihood-based or a posterior based system for example. Training can be a periodic activity with an aperiodic "exception handler" for retraining on indications of deviations from "nominal" conditions. The system aids automated dynamic resource allocation by a central node.

The minimum and maximum thresholds are not required to be the same and do not have to be fixed for all time for every sensor. This provides a mechanism for customizing the maximum allowable sensitivity and the minimum desired sensitivity and enables the creation of a "donation" pool.

The resource pool donation and reallocation adapts the data sensor thresholds and maintains global sensitivity. The on-line optimization of system performance and data throughput after initial user resource allocation can occur with no additional intervention by an operator. Numerous strategies allow reallocation of an excess allocation pool to meet the demands and allow resource sharing to preserve sensitivity on the "active" channels to achieve bandwidth on demand. The data sources in conjunction with the data sensors can control the data generation rate to achieve global sensitivity retention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method of allocating bandwidth for a plurality of data sources within a communications network, comprising:
    establishing data detection thresholds for a plurality of data sensors associated with data sources that generate data along communications channels in a shared communications link to a common node based on an initially allocated data rate for each data source;
    reallocating excess data capacity from underused channels to those channels requiring excess data capacity by sensing data generation at each data source indicative of network resource usage; and
    setting new data detection thresholds for each data sensor based on reallocated data rates at each data source.

2. The method according to claim 1, which further comprises setting maximum and minimum sensitivities of data sensors for sensing data generation at each data source indicative of network resource usage.

3. The method according to claim 1, which further comprises setting detection thresholds for each data sensor to meet an initially allocated data rate.

4. The method according to claim 1, which further comprises setting detection thresholds for each data source during a training interval interspersed with data collection.

5. The method according to claim 4, which further comprises using an order-statistic approach for setting detection thresholds.

6. The method according to claim 4, which further comprises aperiodically retraining when sensing deviations in data generation.

7. A method of allocating bandwidth for a plurality of data sources within a communications network, comprising:
establishing data detection thresholds for a plurality of data sensors associated with data sources that generate data along communications channels in a shared communications link to a common multiplexer node based on an initially allocated data rate for each data source;
reporting from each data sensor a rate demand and reserve bandwidth to the multiplexer node to which the data sources and data sensor are connected;
determining any excess capacity for data sources;
instructing data sources to reallocate excess data capacity from underused channels to those channels requiring excess data capacity; and
setting new data detection thresholds for each data sensor based on reallocated data rates at each data source.

8. The method according to claim 7, which further comprises establishing a pooled bandwidth reserve to allow data sensors to lower detection thresholds and improve sensitivity to lower amplitude events in the communications link.

9. The method according to claim 7, which further comprises setting maximum and minimum sensitivities of data sensors for sensing data generation at each data source indicative of network resource usage.

10. The method according to claim 7, which further comprises setting detection thresholds for each data sensor to meet an initially allocated data rate.

11. The method according to claim 7, which further comprises setting detection thresholds for each data sensor during a training interval interspersed with data collection.

12. The method according to claim 11, which further comprises using an order-statistic approach for setting detection thresholds.

13. The method according to claim 11, which further comprises aperiodically retraining when sensing deviations in data generation at the data sources.

14. A system comprising:
a plurality of data sources that each generate data and transmit the generated data along communications channels in a shared communications link of a communications network, each data source including a data sensor for sensing data generation at each data source indicative of network resource usage;
a node connected to the communications link for receiving the data generated from respective data sources; and
a controller associated with one of at least the node and each data sensor and data source for establishing data sensor detection thresholds, reallocating excess data capacity from underused channels to those channels requiring excess data capacity, and setting new data detection thresholds for each data sensor based on reallocated data rates at each data source.

15. The system according to claim 14, wherein at least one of said controller and data sensors are operative for setting maximum and minimum sensitivities on each data sensor.

16. The system according to claim 14, wherein at least one of said controller and data sensors are operative for setting detection thresholds for each data sensor to meet an initially allocated data rate.

17. The system according to claim 14, wherein at least one of said controller and data sensors are operative for setting detection thresholds for each data sensor during a training interval interspersed with data collection.

18. The system according to claim 14, wherein at least one of said controller and data sensors are operative for using an order-statistic approach for setting detection thresholds.

19. The system according to claim 14, wherein at least one of said controller and data sensors are operative for aperiodically retraining when sensing deviations in data generation.

20. A system comprising:
a plurality of data sources that each generate data and transmit the generated data along a communications channels in a shared communications link of a communications network, each data source including a data sensor for sensing data generation at each data source indicative of network resource usage;
a multiplexer node connected to the communications link for receiving the data generated from respective data sources; and
a controller associated with one of at least the common multiplexer node and each data sensor and data source for establishing data sensor detection thresholds, establishing a pooled bandwidth reserve to allow data sensors to lower detection thresholds and improve sensitivity to lower amplitude events and reallocate excess data capacity from underused channels to those channels requiring excess data capacity, and setting new data detection thresholds for each data sensor based on reallocated data rates at each data source.

21. The system according to claim 20, wherein at least one of said controller and data sensors are operative for setting maximum and minimum sensitivities on each data sensor.

22. The system according to claim 20, wherein at least one of said controller and data sensors are operative for setting detection thresholds for each data sensor to meet an initially allocated data rate.

23. The system according to claim 20, wherein at least one of said controller and data sensors are operative for setting detection thresholds for each data sensor during a training interval interspersed with data collection.

24. The system according to claim 20, wherein at least one of said controller and data sensors are operative for aperiodically retraining when sensing deviations in data generation.

* * * * *